US011004212B1

(12) United States Patent
Liu et al.

(10) Patent No.: US 11,004,212 B1
(45) Date of Patent: May 11, 2021

(54) OBJECT TRACKING METHOD AND SYSTEM USING ITERATIVE TEMPLATE MATCHING

(71) Applicant: Hong Kong Applied Science and Technology Research Institute Company Limited, Shatin (HK)

(72) Inventors: Cheng Hsiung Liu, Shatin (HK); Wang Kit Wilson Thong, Shatin (HK); Man Wai Kwan, Shatin (HK); Zijian Xu, Shatin (HK); Yiu Man Lam, Shatin (HK); Jihui Zhang, Shatin (HK); Jiaxin Yan, Shatin (HK)

(73) Assignee: HONG KONG APPLIED SCIENCE AND TECHNOLOGY RESEARCH INSTITUTE COMPANY LIMITED, Shatin (HK)

(*) Notice: Subject to any disclaimer, the term of this patent is extended or adjusted under 35 U.S.C. 154(b) by 30 days.

(21) Appl. No.: 16/733,063

(22) Filed: Jan. 2, 2020

(51) Int. Cl.
G06K 9/00 (2006.01)
G06T 7/207 (2017.01)
(Continued)

(52) U.S. Cl.
CPC ............. G06T 7/207 (2017.01); G06K 9/36 (2013.01); G06K 9/6202 (2013.01); G06T 2207/10016 (2013.01)

(58) Field of Classification Search
None
See application file for complete search history.

(56) References Cited

U.S. PATENT DOCUMENTS 8,098,889 B2 * 1/2012 Zhu .................... G08G 1/167
382/103
8,942,423 B2 1/2015 Patwardhan et al. ........... 7/12
(Continued)

FOREIGN PATENT DOCUMENTS

CN 105744234 A 7/2016
CN 106570892 A 4/2017
(Continued)

OTHER PUBLICATIONS

Notification of Transmittal of the International Search Report and the Written Opinion of the International Searching Authority, or the Declaration dated Oct. 12, 2020, issued by National Intellectual Property Administration in corresponding application PCT/CN2020/073727.

Primary Examiner — Shervin K Nakhjavan
(74) Attorney, Agent, or Firm — Stein IP, LLC

(57) ABSTRACT

A method and system for tracking a position and orientation of a target object that moves along a two-dimensional plane, a camera to generate video frames of the target object, and a processor configured to correct perspective scaling of a current one of the video frames; estimate a current location and angle of the target object using a motion model or its previous location/angle; cut out a region of interest from the current video frame around the estimated current location; resize the region of interest to shrink its size by a predetermined ratio M (width=width/M, height=height/M) or equivalently reducing the image resolution of the region of interest by the ratio M (resolution=resolution/M); track a new location of the target object by template matching the current region of interest with a previously stored template; and either conclude the tracked target object location and angle are accurate and updating the template if a stopping criterion is reached with indication of successful tracking, or
(Continued)

proceed with a refinement method to refine the tracked location and angle until the stopping criterion is eventually reached.

19 Claims, 12 Drawing Sheets

(51) Int. Cl.
*G06K 9/62* (2006.01)
*G06K 9/36* (2006.01)

(56) References Cited

U.S. PATENT DOCUMENTS

| | | | | |
|---|---|---|---|---|
| 2004/0054473 A1* | 3/2004 | Shimomura | ............ | G06T 7/248 701/301 |
| 2008/0166045 A1* | 7/2008 | Xu | ............ | G06T 7/251 382/170 |
| 2008/0316311 A1* | 12/2008 | Albers | ............ | G06F 16/7837 348/143 |
| 2010/0033579 A1* | 2/2010 | Yokohata | ............ | H04N 5/232 348/169 |
| 2011/0001840 A1* | 1/2011 | Ishii | ............ | G02B 7/365 348/222.1 |
| 2011/0013028 A1 | 1/2011 | Zhou et al. | ............ | 348/208.6 |
| 2014/0275985 A1 | 9/2014 | Walker et al. | ............ | 600/424 |
| 2015/0206002 A1* | 7/2015 | Ponten | ............ | G06T 7/246 382/103 |
| 2018/0040133 A1 | 2/2018 | Srinivasan et al. | | |
| 2019/0043168 A1* | 2/2019 | Rampal | ............ | G06K 9/6212 |

FOREIGN PATENT DOCUMENTS

| | | |
|---|---|---|
| CN | 107481264 | 12/2017 |
| CN | 109598756 A | 4/2019 |
| EP | 1 126 414 A2 | 8/2001 |
| GB | 2569803 A | 7/2019 |

\* cited by examiner

OBJECT TRACKING METHOD AND SYSTEM USING ITERATIVE TEMPLATE MATCHING

BACKGROUND OF THE INVENTION

1. Field of the Invention

Aspects of the present invention relate to an object tracking method and system using iterative template matching. More particularly, aspects of the present invention focus on a method for object tracking based on template matching in an application scenario of 5G low latency high reliability link between an object and a control server.

2. Description of the Related Art

There are two common ways to track or locate an object using a camera, namely, by detection or tracking. The camera generates video frames during the tracking process and outputs the results to a control server (server). The object locating method takes each video frame as input and then produces output, such as a type, angle and coordination of the object. For detection, the user has to analyze entire video frames. The advantage of this method is that it does not require any previous video frame with a processing speed of the server (or a processor) in the order of hundreds of milliseconds (ms). For tracking, the user only analyzes a small region of a video frame with a processing speed of the server (or processor) in the order of tens of ms. Therefore, the processing speed of tracking is faster than that of detection.

Open source trackers, such as CORR, CSRT, BOOSTING, GOTURN, KCF, MEDIAN, FLOW, MIL, MOSSE, and TLD are able to track non-rigid objects, which are objects the shape of which could be constantly changing, for example, faces and animals. However, the open source trackers are not able to track a non-rigid object accurately to a few pixels of a video frame and are slow in processing. Searching fixed geometric shapes or patterns, which are called rigid objects, is accurate to a few pixels in tracking of the rigid object, for example, a rectangle, a circle, dashed lines, etc. However, the open source trackers are unable to handle occlusion. On the other hand, matching with a template is accurate to a few pixels in the tracking of rigid objects and is very fast in processing, but still unable to handle object scaling and rotation requirements.

Template matching is a classical technique used in computer vision. Template matching uses raw pixel values as well as the spatial relations of the pixels to find a target object in an image. A user-defined metric to calculate a confidence score is used to measure the similarity between the template and an image patch. A reason of using template matching is because it is fast since it uses raw information without pre-processing. In fact, other pre-processing techniques may not only consume more time, but also put a constraint on the object feature of the target object. Template matching is also accurate since it conducts a pixel-to-pixel computation to get the confidence score.

However, issues with template matching are shown in FIGS. 1 and 2. The simplicity of this technique comes with some common issues when applying the same. When any of the following conditions happens, template matching might fail. With respect to FIG. 1, template matching might fail when the template and the target object are not in the same orientation (rotation) (i.e., Case 1 in FIG. 1), the template and target object are not in the same scale (i.e., Case 2 in FIG. 1), the template and the target object are not in the same orientation and the same scale (i.e., Case 3 in FIG. 1), and/or the template and target object look too different to the server. Examples of the template and the target object looking different may be the result of blurring, difference in illumination or occlusion as shown in FIG. 2.

SUMMARY OF THE INVENTION

In order to overcome above and/or other technical barriers, aspects of the present invention include a tracking method and system using an iterative template matching approach to locate target objects efficiently through the use of a camera without the need of any extra sensors or cameras.

According to an embodiment, a method of the iterative template matching reduces computation time of a server for real-time application purposes. Within a target time, the method goes through a refinement process to improve accuracy.

According to an embodiment, the method is able to adjust to target object appearance variations, using a calibration procedure, a template update procedure, and an angle detection procedure.

According to an embodiment, the method estimates a target object's new location by narrowing down a search region in a neighborhood of the target object. Within this search region a search is performed. An assumption is made that location and orientation of the target object will not change much between video frames taken by a camera, which is generally true when the target object is distant from the camera.

According to an embodiment, there is an iterative method of tracking a position and orientation of a target object that moves along a two-dimensional plane, comprising: generating video frames of the target object using a camera; correcting perspective scaling of a current one of the video frames; estimating a current location and angle of the target object using a motion model or its previous location/angle; cutting out a region of interest from the current video frame around the estimated current location; resizing the region of interest to shrink its size by a predetermined ratio M (width=width/M, height=height/M) or equivalently reducing the image resolution of the region of interest by the ratio M (resolution=resolution/M); tracking a new location of the target object by template matching the current region of interest with a previously stored template; and either concluding the tracked target object location and angle are accurate and updating the template if a stopping criterion is reached with indication of successful tracking, or proceeding with a refinement method to refine the tracked location and angle until the stopping criterion is eventually reached.

According to another embodiment, there is a system for tracking a position and orientation of a target object that moves along a two-dimensional plane, comprising: a camera to generate video frames of the target object; and a processor configured to: correct perspective scaling of a current one of the video frames; estimate a current location and angle of the target object using a motion model or its previous location/angle; cut out a region of interest from the current video frame around the estimated current location; resize the region of interest to shrink its size by a predetermined ratio M (width=width/M, height=height/M) or equivalently reducing the image resolution of the region of interest by the ratio M (resolution=resolution/M); track a new location of the target object by template matching the current region of interest with a previously stored template; and either conclude the tracked target object location and angle are accurate and updating the template if a stopping criterion is reached with indication of successful tracking, or proceed with a refinement method to refine the tracked location and angle until the stopping criterion is eventually reached.

According to yet another embodiment, there is a non-transitory computer readable medium to control a method of iteratively tracking a position and orientation of a target object that moves along a two-dimensional plane by operating a program on a processor, the method comprising: generating video frames of the target object using a camera; correcting perspective scaling of a current one of the video frames; estimating a current location and angle of the target object using a motion model or its previous location/angle; cutting out a region of interest from the current video frame around the estimated current location; resizing the region of interest to shrink its size by a predetermined ratio M (width=width/M, height=height/M) or equivalently reducing the image resolution of the region of interest by the ratio M (resolution=resolution/M); tracking a new location of the target object by template matching the current region of interest with a previously stored template; and either concluding the tracked target object location and angle are accurate and updating the template if a stopping criterion is reached with indication of successful tracking, or proceeding with a refinement method to refine the tracked location and angle until the stopping criterion is eventually reached.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
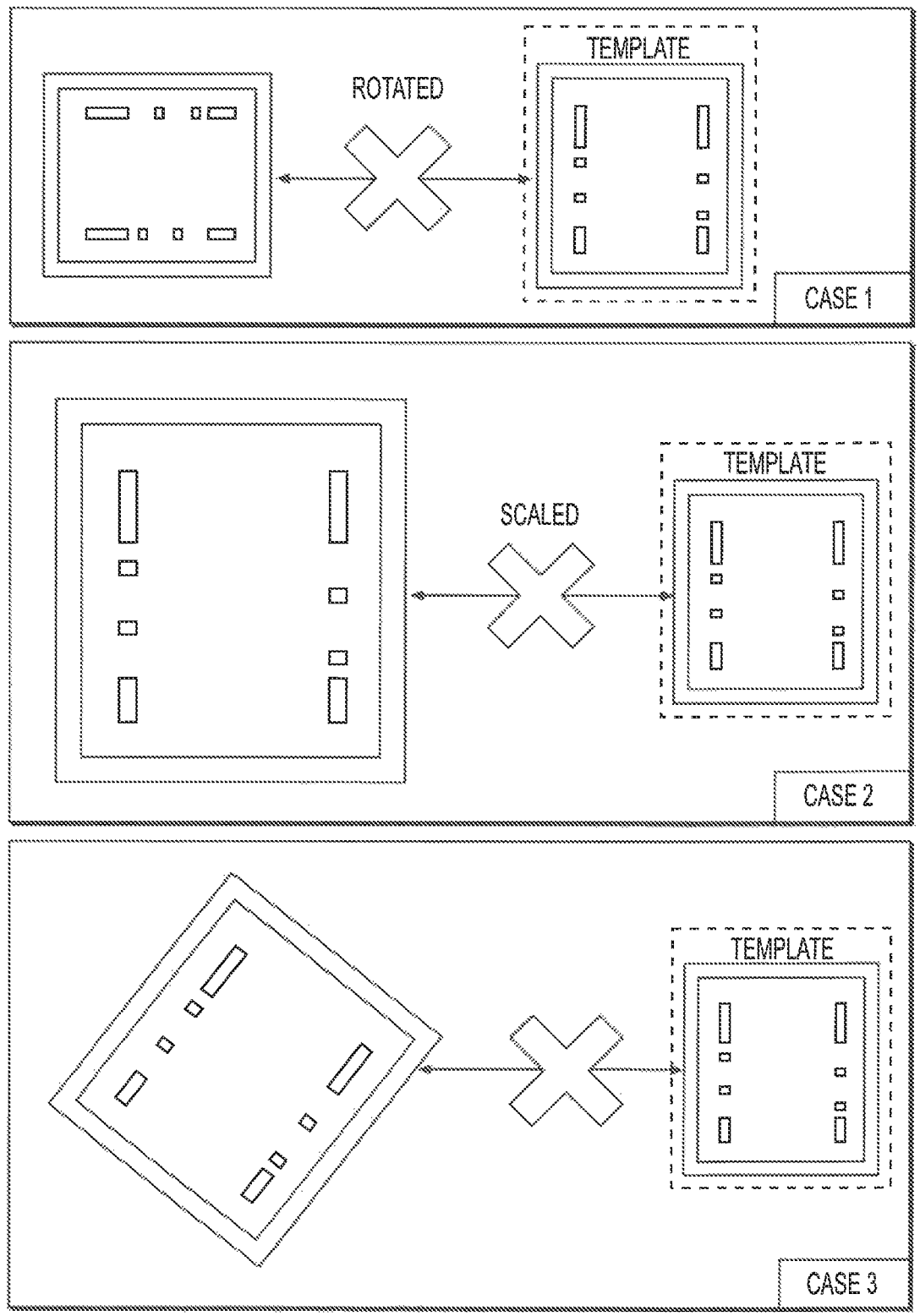
FIG. 1 show examples of issues relating to template matching between a template and a target object according to the prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In academic literature, there has been research on developing sophisticated feature extractors to perform target object tracking. In general, there is a tradeoff curve for each respective target object tracking method with respect to time versus accuracy. Aspects of the present invention relate to a particular application environment, and corresponding methods in the particular environment outperform other tracking methods. However, it noted that certain assumptions are embedded in the tracking methods according to embodiments of the present invention, and the tracking methods are optimized for that particular environment to fully utilize the characteristics of that particular environment, at the cost of making the tracking methods less general.

Figure 2:
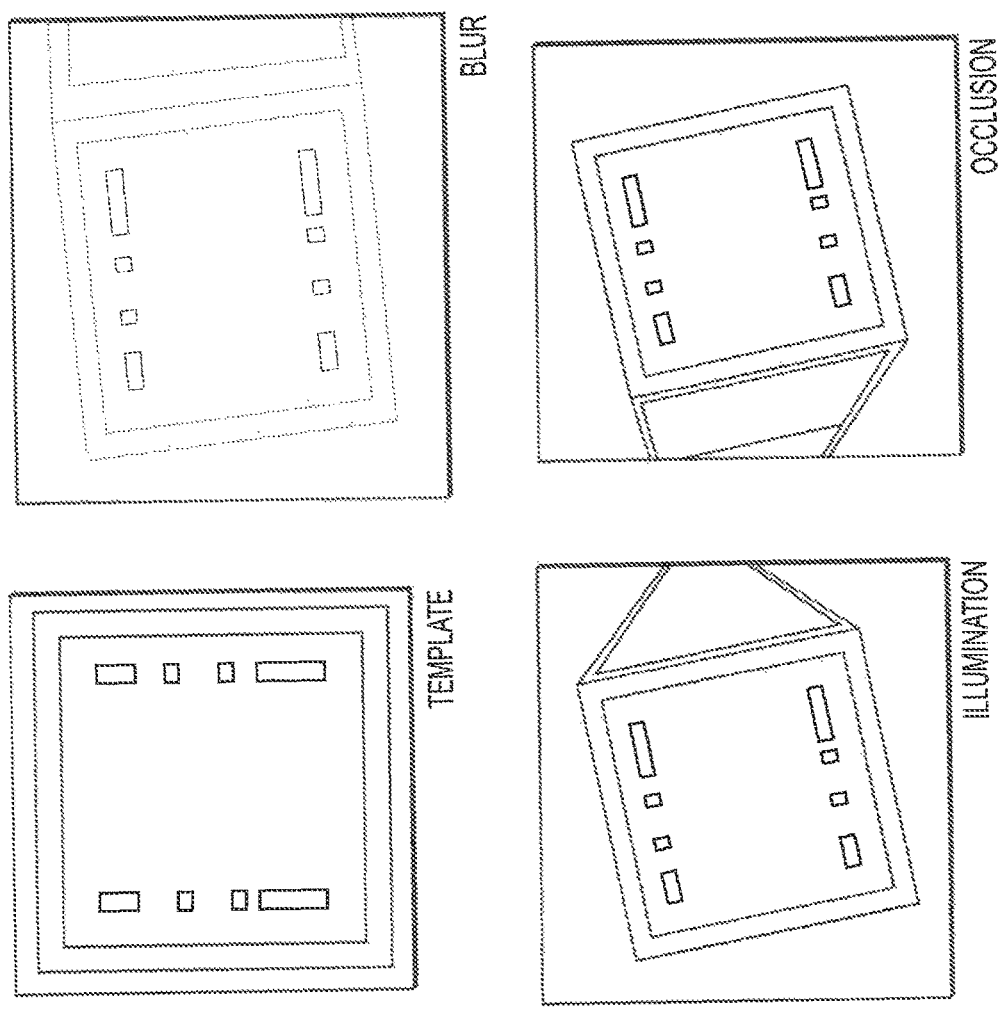
FIG. 2 show further examples of issues relating to template matching between a template and a target object.

As noted above in the Summary of the Invention, in order to overcome the above and/or other technical barriers and illustrated in FIGS. 1 and 2, aspects of the present invention include a tracking method and system using an iterative template matching approach to locate target objects efficiently through the use of a camera without the need of any extra sensors or cameras.

According to an embodiment, a method of the iterative template matching reduces computation time of a server for real-time application purposes. Within a target time, the method goes through a refinement process to improve accuracy.

According to an embodiment, a method is able to adjust to target object appearance variations, using a calibration procedure, a template update procedure, and an angle detection procedure.

According to an embodiment, a method estimates an object's new location by narrowing down a search region in a neighborhood of a target object. Within this search region a search is performed. An assumption is made that location and orientation of the target object will not change much between video frames of a camera, which is generally true when the target object is distant from the camera.

Apart from the drawbacks of previously noted issues related to template matching known to date, additional requirements on the processing speed of a method employed according to an embodiment of the present invention is that the method is to be run in real-time. Due to the time constraints of operating in real-time, aspects of the present invention can use a brute force way to solve template matching issues of pre-making lots of templates, each representing a different state of scale/angle/illumination, as a more efficient way is required to tackle the problems related to previous template matching methods.

Thus, the methods according to embodiments of the present invention introduce solutions to solve the issues relating to: scale, rotation, appearance variations, and speed.

In general, addressing the scaling issue could be difficult due to the dynamics of target objects being in 3-dimensional (3-D) space. It can be even harder if the target object is non-rigid, namely, the shape of the object could be constantly changing.

Aspects of the present invention use the following assumptions:

a camera (vision device) is fixed, such as on a ceiling of a factory, and the target object is rigid and moving on a flat ground, Consequently, the following described methods assume that:

1. The target objects only move in 2D space; and
2. The target objects are rigid.

Figure 3:
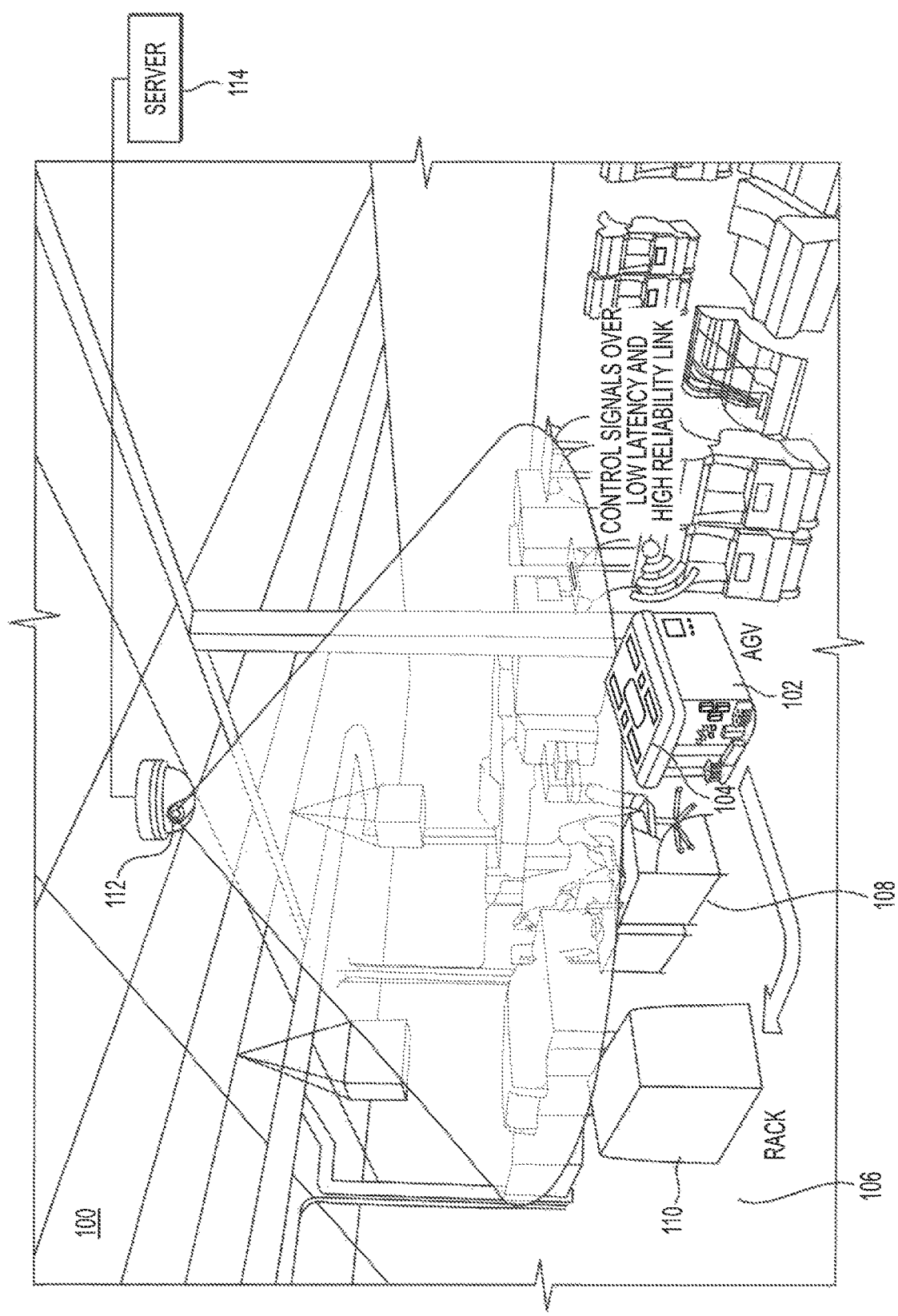
FIG. 3 shows a perspective view of a system which uses template matching according to an embodiment of the present invention.

FIG. 3 is an example of one environment to which the assumptions noted above are applicable. FIG. 3 shows a factory 100 environment in which an automated guided vehicle (AGV) 102 has a target object 104 affixed or applied thereto and moves along a factory floor 106. The AGV 102 needs to navigate to avoid obstacles 108, such as people or desks or any other object that may be present on the factory floor 106, to arrive at a destination such as a rack 110. A camera 112 is fixed directly to a ceiling above the factory floor 106 to provide video frames (video images) of everything that is present and moving along the factory floor 106.

The camera 112 has a birds-eye view of objects on the factory floor 106, including the target object 104 which moves along the factory floor 106. The video frames are forwarded by the camera 112 to a computer server 114 (not necessarily in the factory 100, but locatable anywhere), and the AGV 102 and the control server 114 have a communication link, including, but not limited to, a 5G low latency high reliability link (element 202 shown in FIG. 4).

Environments other than a factory, and other moving objects and target objects and other obstacles and destinations are fully contemplated to be within the scope of the present invention.

Figure 4:
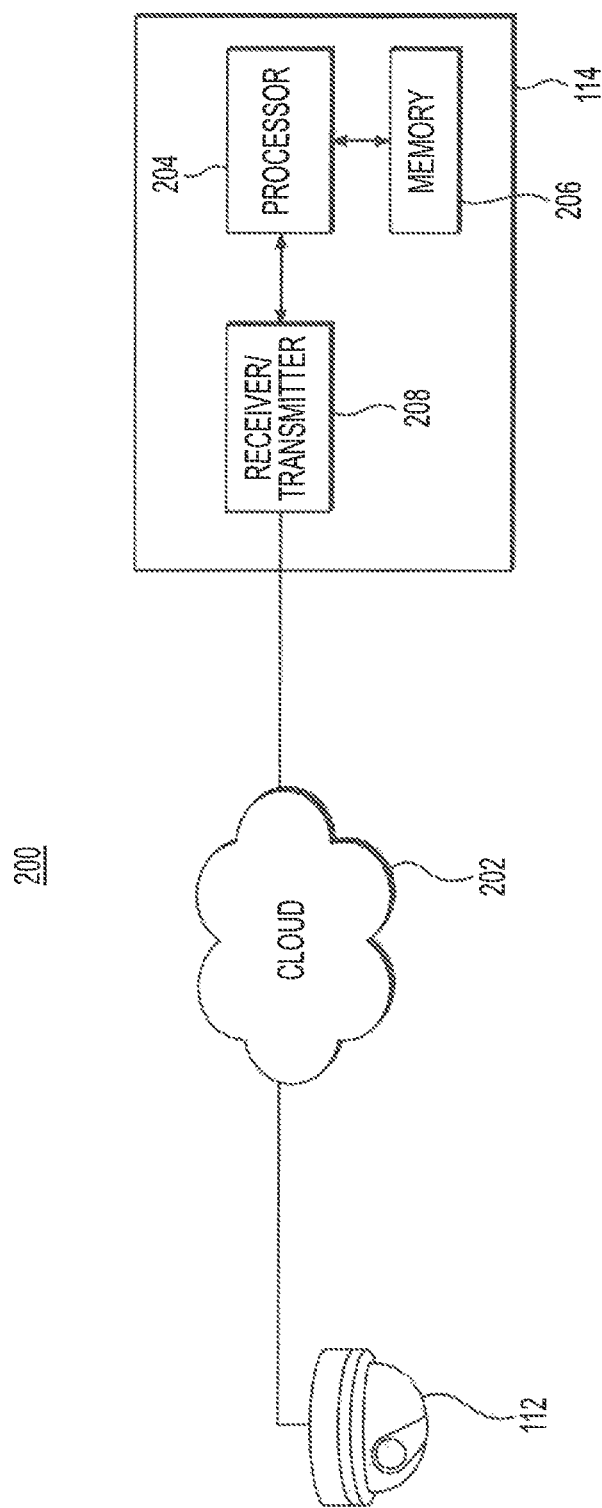
FIG. 4 illustrates a schematic block diagram of a computer server used in the system shown in FIG. 3.

FIG. 4 shows a tracking system 200 for achieving the methods according to embodiments of the present invention. The camera 112 is connected to the server 114 by a communication link 202, such as wired, Wi-Fi, cellular, 3G, 4G, 5G, etc. The server 114 includes a processor 204 which controls the overall operation of the server 114 by executing an operating system program and one or more application programs stored in a memory 206. The processor 204 may be singular or plural, and may be, but not limited to, a CPU, GPU, DSP, APU, or FPGA. The memory 206 may be singular or plural, and may be, but not limited to, being volatile or non-volatile, such an SDRAM, DRAM, SRAM, Flash Memory, MRAM, F-RAM, or P-RAM. The processor 204 receives video frames taken by the camera 112, transmitted over the communication link 202 and received by a receiver/transmitter 208 of the server 114.

The memory 206 may comprise a non-transitory machine-readable medium, a machine-readable storage medium, a computer-readable storage medium, or any suitable combination thereof which stores a non-transitory, tangible computer program product comprising computer program code which when executed on the processor 204 is arranged to perform any of the following methodologies.

Figure 5:
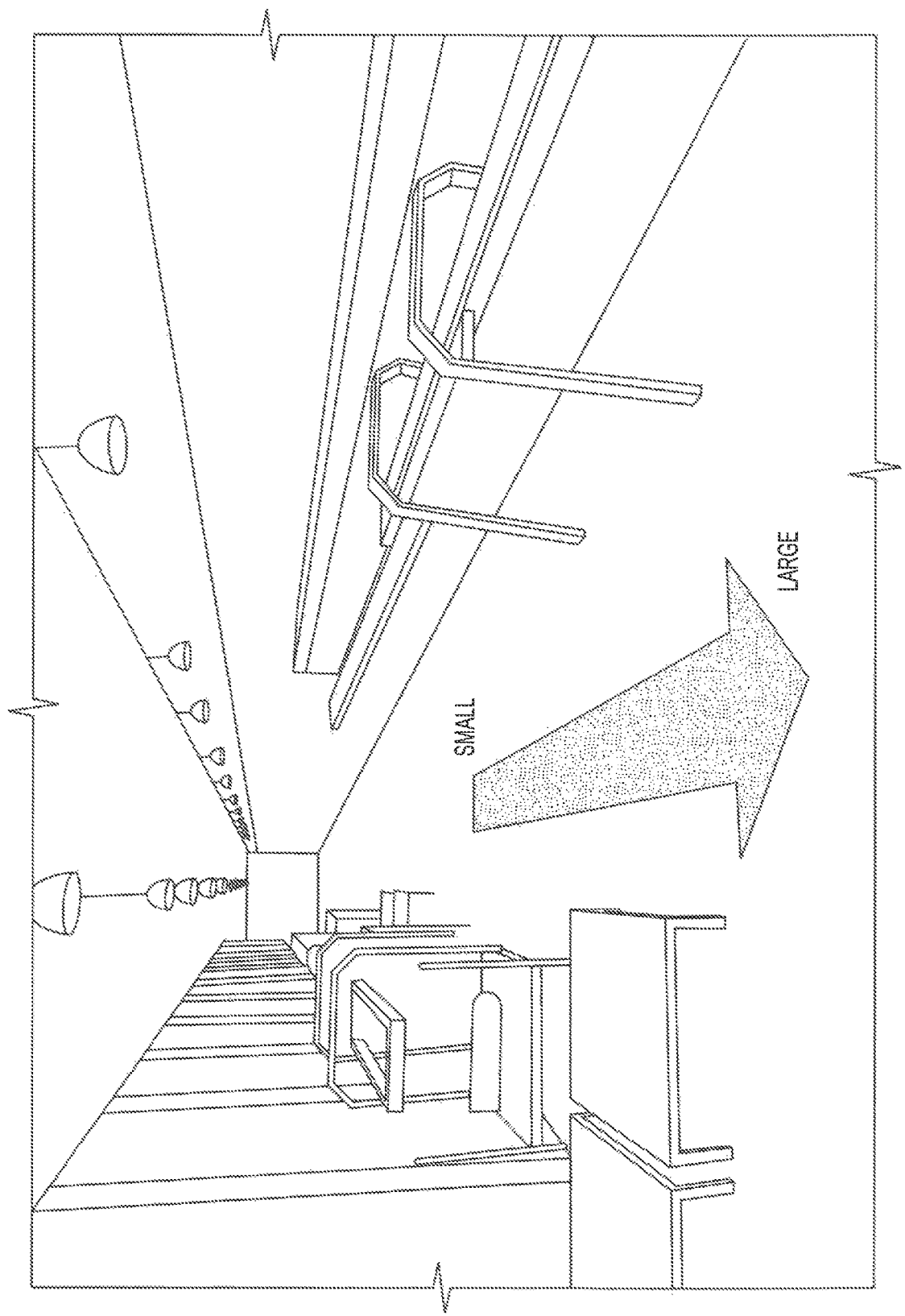
FIG. 5 is a diagram showing a perspective view of a factory floor.

By having an AGV (moving object) 102 and thus the target object 104, moving in a 2-D space, the assumption is made that the target object 104 is limited to movement along the factory floor 106 in the 2-D space, and does not leave the surface of the factory floor 106. Thus, it is assumed that the target object 104 does not 'fly' or 'jump' towards the camera 112. Another assumption is that a camera-captured object scale depends only on the movement of the target object 104, and nothing else. Thus, it is assumed that the only reason that the target object 104 may appear to be in different scale is due to perspective scaling. By perspective scaling, it is meant that, for example in FIG. 5, the target object 104 may appear to be bigger or smaller due to perspective and the variance in distance between the target object 104 and camera 112.

Figure 6:
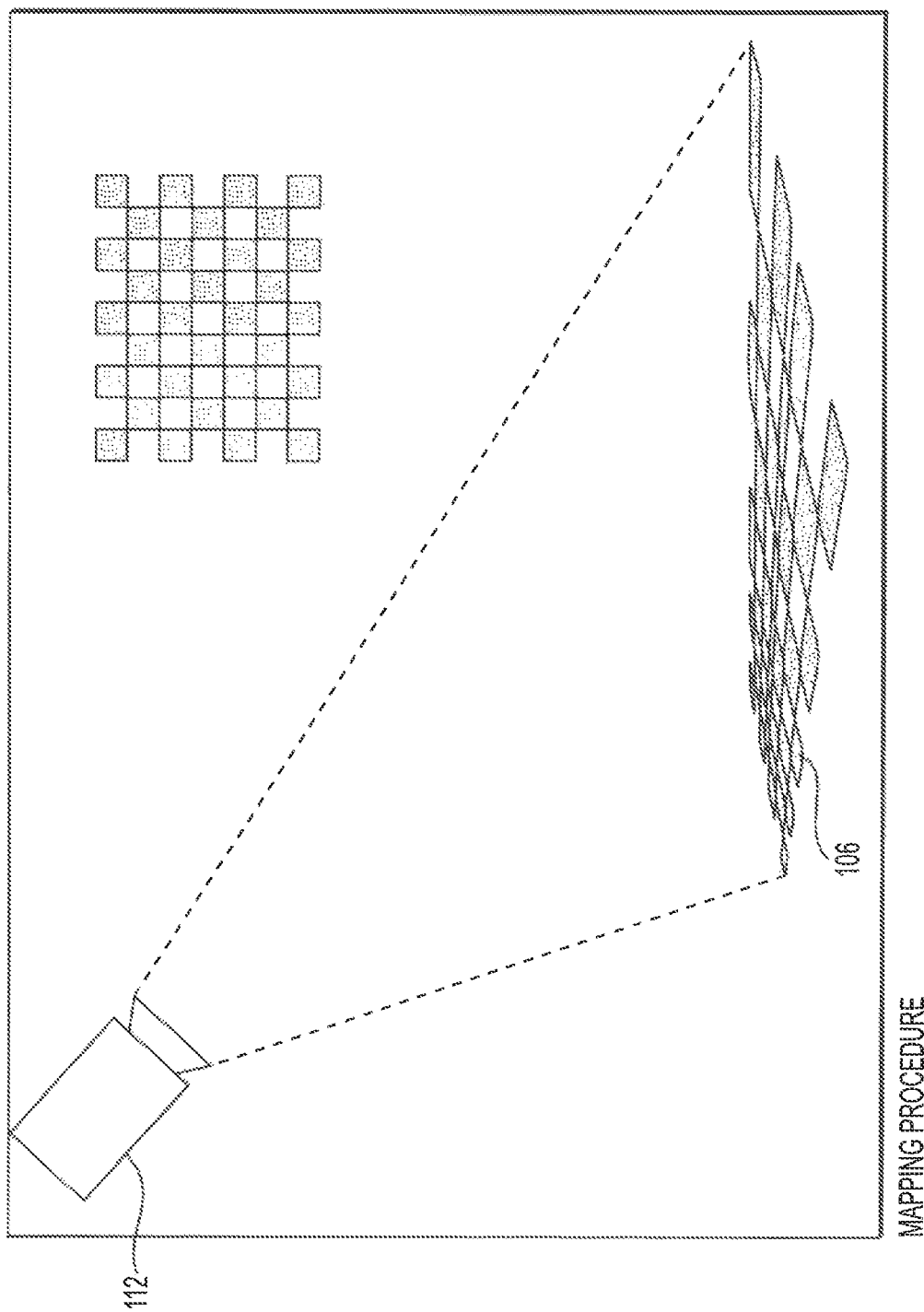
FIG. 6 shows a camera calibration via a mapping procedure according to an embodiment.

To solve this issue, the processor 204 conducts camera calibration via a mapping procedure beforehand as shown in FIG. 6. An existing method such as chessboard calibration or camera calibration with OpenCV, may be used to conduct camera calibration. Simply put, it is desired to know the mapping function between a pixel (in a video frame captured by the camera 112)↔meters (real-world physical quantity) of an area of the factory floor 106. The goal is to make the pixel-area of the target object 104 be identical everywhere in the captured video frame so that template matching without scale concerns can be performed. In other words, the camera calibration is performed by estimating camera optical properties including camera intrinsic matrix and distortion coefficients, and establishing a coordinate system into the camera 112 by marking multiple real-world coordinates onto video frames generated by the camera 112.

While the mentioned camera calibration techniques have almost become a standard way to undistort images captured by cameras, applying it to a perspective-correction purpose takes little extra effort. Therefore, the scale issue in template matching can be solved relatively easily.

Figure 7:
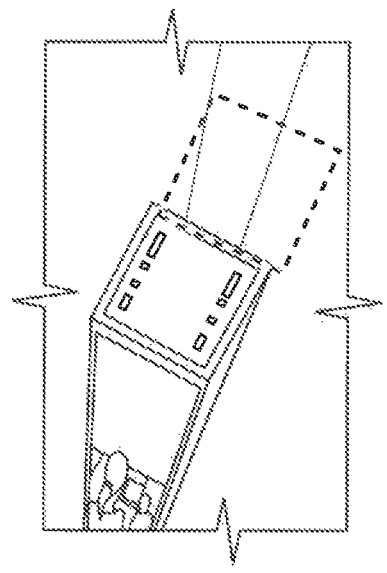
FIG. 7 shows a tracking method of a tracking object wherein the tracking object is in a highly illuminated area.
Figure 7:
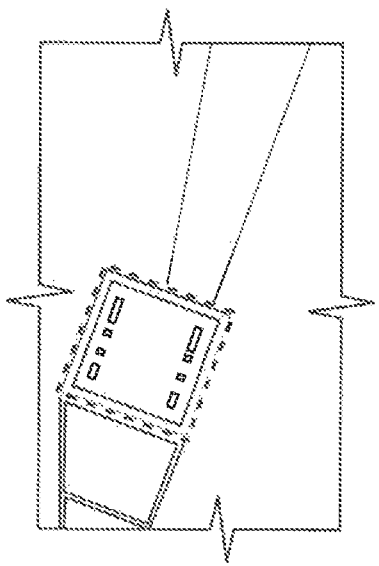
Figure 8:
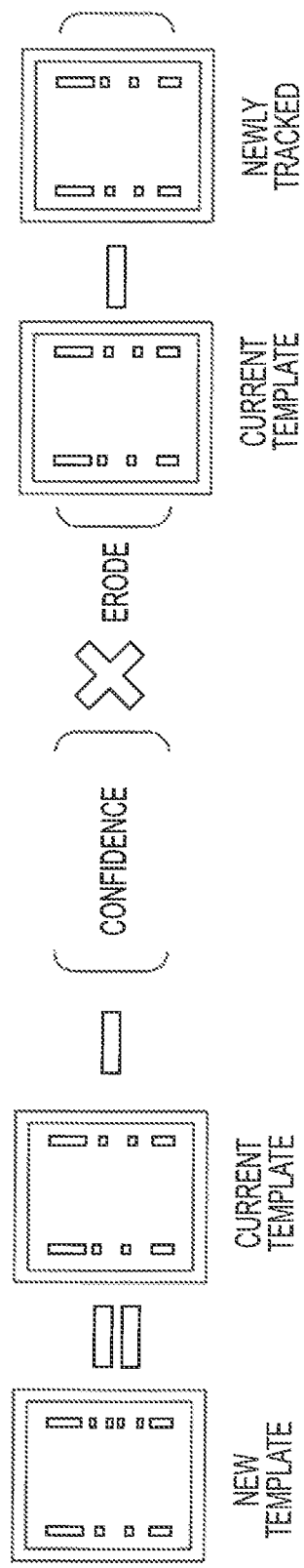
FIG. 8 shows a final update process which provides a best tracking result of a tracking method according to an embodiment.

The processor 204 tracks the target object 104, which here, is formed of a simple pattern(s) with clear edges as shown in FIGS. 7 and 8 (the simple pattern being two parallel dotted and dashed lines). By detecting the angle of these edges, the orientation of the simple pattern can be determined, which in turn indicates the target object's heading angle (other shapes are contemplated and considered to be within the confines of the present invention). Because clear edges appear as straight lines in a video frame, various existing line detectors can be used to find the angle of the edges. While straightforward, this method would potentially produce many false positives since lines are very common everywhere. Therefore, two extra filtering conditions are added in order to reduce the number of false positives.

First condition: the lines angle detected in a current video frame should be similar to the object's heading angle in a previous frame. Since object tracking is being performed, the object information (angle, location, appearance) is continuous in the sense that the values should not alter much between frames. Second condition, line detectors only detect lines in a small region. The smaller the region, the fewer are the false positives. In a hierarchical searching structure, to be explained subsequently, a line detector uses a smaller and smaller region.

Appearance Variations

Referring to FIG. 2 again, an identical object may appear to be different pixel-wise due to environmental variations. For example, illumination across the scene may be non-uniform so that there might be very bright as well as very dark versions/portions of an identical target object 104. So, the current method adaptively changes a current template to account for these changes. One option is to aggressively use the newly captured target object 104 image as the new template. This has a drawback of suffering from error propagation, since a newly matched image patch (a small sub-image of the original video frame) may inevitably contain some error (pixels that are not from the target object 104) or temporary blur (pixels do come from the target object 104, but are blurred in some sense such that the camera 112 may not capture the true target object 104 features). If these pixels are misleading, for example, as shown in FIG. 7, in the highly illuminated region, the tracking method can gradually drift away from the target object 104.

To strike a balance between 'no update' and 'update too much' of the template, the method updates the template in an adaptive way by using a corresponding confidence score. The confidence score, normalized to between 0 and 1, can be thought of as the probability the particular image patch contains the target object 104. In standard template matching, mathematically it is $$R(x, y) = \frac{\sum_{x',y'} (T(x', y') \cdot I(x + x', y + y'))}{\sqrt{\sum_{x',y'} T(x', y')^2 \cdot \sum_{x',y'} I(x + x', y + y')^2}}$$

Therefore, at the end of the template matching process, the image patch with the highest confidence score is obtained, and the confidence score R(x,y) in the previous formula is used to update the template: if highly confident, updating is done more aggressively; else, updating is done more conservatively. The final update process is shown in FIG. 8 which empirically provides the best tracking result. Mathematically, this update process is based upon the following equation.

$$T_{new} = T_{current} - R_{out} \times (E^*(T_{current} - T_{out}))$$

where $T_{new}$, $T_{current}$ and $T_{out}$ are all a template matrix of the same dimension, and $T_{new}$ is the template made for the next frame of the video, $T_{current}$ is the template that was used in the current frame to do template matching and $T_{out}$ is the resulting image patch from the template matching of this video frame. $R_{out}$ is the corresponding confidence of $T_{out}$. E is a matrix for erosion, and * is a convolution operator.

Speed

As noted previously, real-time tracking is desired. For example, the camera 112 may be feeding the server 114 video frames over the communication link 202 at the speed of 10 frames-per-second (FPS). It is undesirable to have the tracking method be a bottleneck of the whole tracking system 200, so an aim is to do the tracking at a speed of no slower than 10 FPS. Equivalently, given each frame, the target object 104 is tracked within 100 ms.

Figure 9:
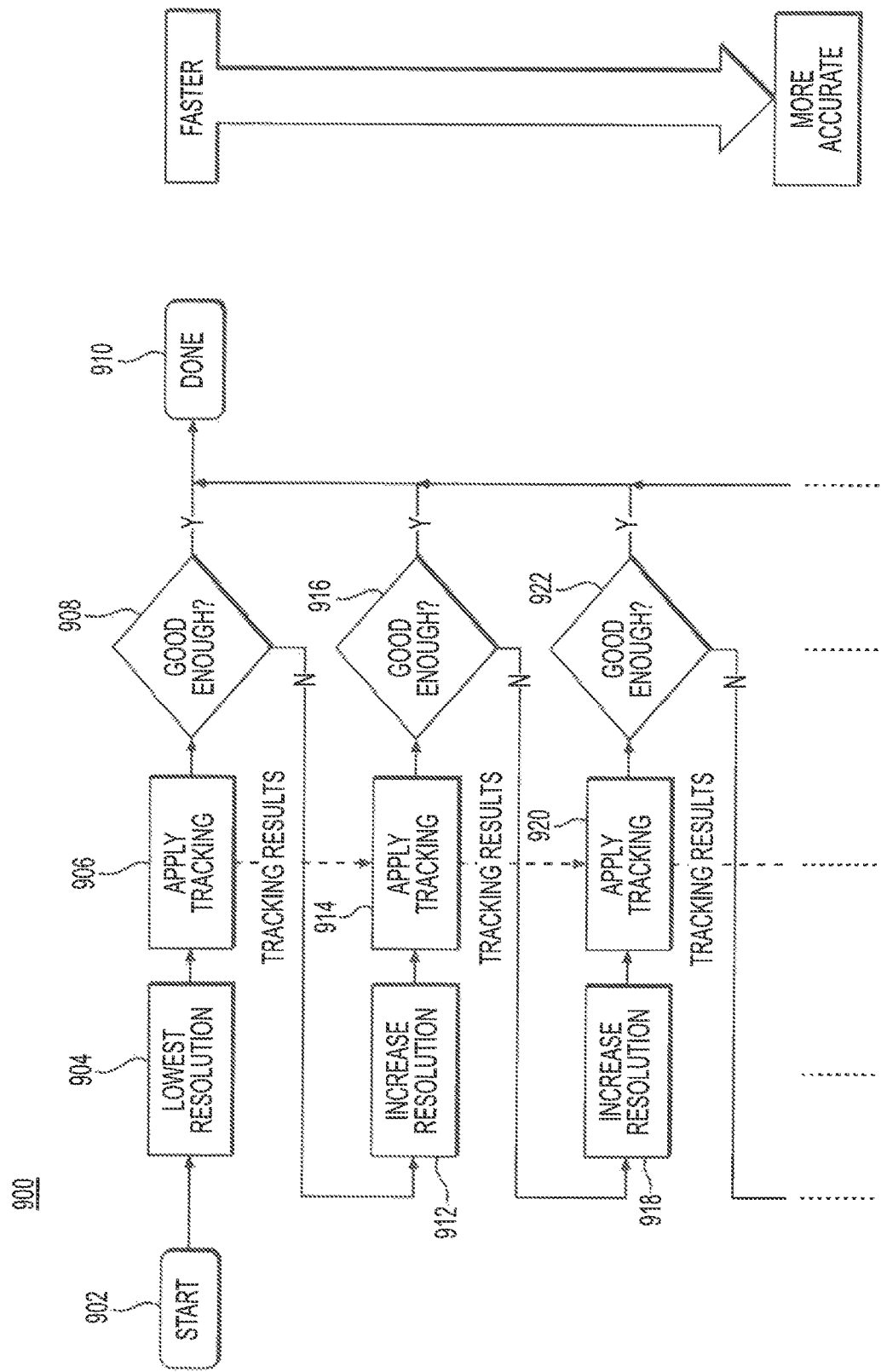
FIG. 9 shows a method of performing iterations from a coarsest to finest scale resolution of video frames.

According to an embodiment, a coarse-to-fine searching hierarchy with early stopping criteria is used. Essentially, the tracking method performs iterations from the coarsest to the finest scale resolution-wise (called image pyramid) as shown in FIG. 9. That is, in the coarsest scale, the image has been down sampled to a smallest resolution (determined by a user-defined ratio), which in turn could be processed faster, at the price of accuracy since only part of the given frame is being used. In the finest scale, a full-resolution frame is used. It is noted that the idea of image pyramiding is a common technique used in the computer vision field. The current method builds a refinement structure based on this pyramid, which will be made clearer hereinbelow.

During the iteration process, an amount of time spent (accumulated from the very beginning of the current frame) is kept, and the process ensures that the processing time on one frame is less than 100 ms. If within the time limit, the method can execute one more iteration in order to improve tracking accuracy, or choose to leave early if the method achieves a high enough confidence score that the target object 104 has been correctly tracked. See FIG. 12 for details relating to the confidence score. If the output of the template matching exceeds a constant confidence threshold, the method is confident enough in the template matching to proceed.

On the other hand, if the time limit has passed in any iteration, the method should stop immediately. When forced to stop, depending on the confidence, the method can either choose to output the tracking result or can choose to stop tracking (lose tracking). The reason for forcing the stoppage is to prevent frame drops in successive frames. Frame drops could lead to discontinuity in information, that is, the tracking object current location, the heading angle and appearance may change more drastically than expected, and the advantage of video tracking could be lost, which may lead to failure in the method.

Referring to FIG. 12 again for the flow of the iteration process, as mentioned, that in each iteration, the method sets a video frame to a particular reduced resolution. The more the method iterates, the less is the reduction in resolution. Suppose for example, we have a 1000×1000 resolution image. In first iteration, the method resizes it to 100×100, and in the second iteration the method resizes the original 1000×1000 image to 200×200. As more iterations are performed, the higher the resolution becomes (the resolution being higher than in a previous iteration). The reduction in resolution of 200×200 image is less than the reduction in resolution of 100×100, while both 100×100 and 200×200 are resolution-reduced versions of the original 1000×1000 image. A relevant point to note is that the method is reusing the result from the previous iteration, so that no information is wasted. This has the advantage to shrink a candidate region in a later iteration, which in turn saves some computation time. This is the idea of refinement, since improvements are based on intermediate results. The following example illustrates this idea further.

In FIG. 9, the iterative template matching process starts in step 902 and uses a videoframe whose resolution is 1000×1000 in step 904. The video frame is resized to a lowest resolution first, for example 100×100. This lowest resolution is predefined. In step 906, tracking is performed. Then, in step 908, the process checks if the confidence score from the template matching is larger than a predefined threshold (good enough). If "Yes" the process is done. If "No" then in step 912, the process resizes the video frame to, say, 200×200 (increases the resolution). This resolution is slightly finer than what is was in the first iteration. Then, in step 914, the tracking is applied again. Then, in step 916, the process checks if the confidence score is large enough. If "Yes" the iterative template matching process is done (step 910). If "No" then the process repeats the increasing of the resolution (step 918), the application of the tracking (step 920) and determining whether the confidence score is high enough (step 922).

An Example of Refinement Iterations

Figure 10:
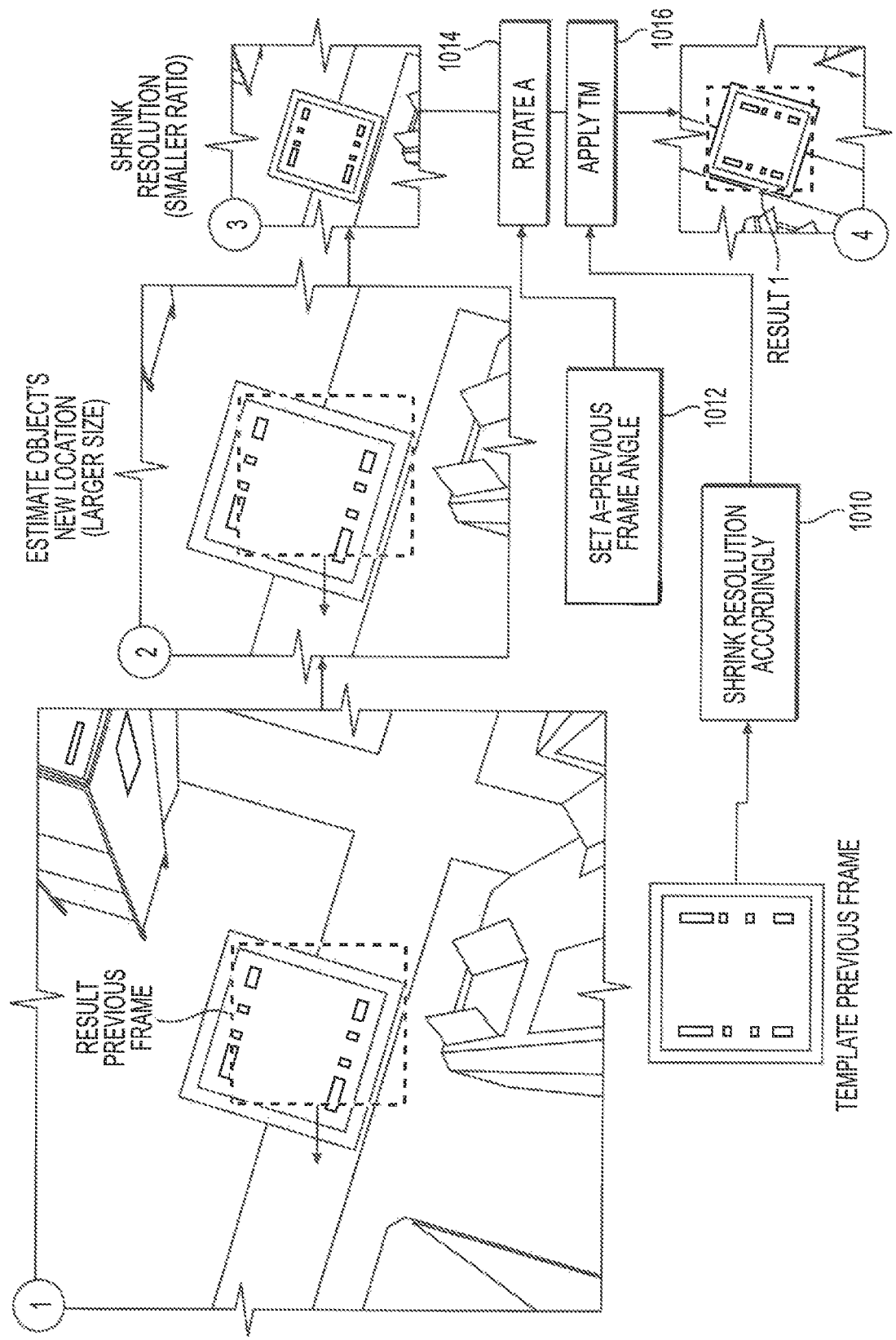
FIG. 10 shows a process flow of a first iteration of the method shown in FIG. 9.

FIG. 10 shows the flow in the first iteration. In image 1, a video frame is received. Also, the information from the previous frame is received, drawn in white dashed lines.

In image 2, a region of interest is cropped from the video frame. This cropping accelerates the tracking process, focusing only on highly probable regions. The cropping is centered at the target object's 104 previous frame location, extended by a user-defined ratio.

In image 3, the resolution is shrunk (see step 1010). As mentioned, this is the concept of coarse-to-fine searching.

Afterwards, some implementation details are performed. Since the template is stored with a fixed resolution and angle, the following is performed. 1) Shrink the template as what was done to the video frame (step 1010); and 2) set angle A to be that of the previous frame angle (step 1012), and rotate the video frame by angle A (step 1014) (or one can choose to rotate the template, which has an identical effect). Then, the angle from the previous frame is directly rotated for two reasons: the first is to only get a very rough idea of the new target object center, so that an accurate heading angle is not needed. The second point is that even if the angle is detected, angle accuracy could be greatly affected by the noise in the environment. For example, line detectors are used to determine heading angle, which could be easily fooled by yellow traffic lines on the factory floor 106. At later iterations, the second point is relieved (less noise from the environment), and as a result, the heading angle is detected to get a more accurate value.

The previous angle is estimated by estimating a plurality of angle candidates by an edge-based algorithm, clustering the plurality of angle candidates, and calculating an absolute numerical difference between an original angle with the plurality of angle clusters and finding the lowest difference. Using line-detectors is an example of one way to estimate the previous angle.

An alternative way (blind search) to detect the previous angle, in the case that the target object does not have clear edge pattern to detect lines, is to reduce the image processing resolution, cut out the region of interest from the current frame around a previous position of the target object; rotating the current region of interest with a plurality of neighboring angles, and conducting template matching between the stored template and the plurality of rotated regions of interest respectively, finding out the plurality of highest confidence scores; and finding the angle with the greatest highest confidence score.

In image 4, a result from the template matching 1016 is achieved. It can be seen that the heading angle is not correct. Also, the center might be not accurate enough as well. But that's fine, since the iteration process can go on to refine this result. Initial iterations are used to only provide rough information, rather than outputting an accurate result.

Figure 11:
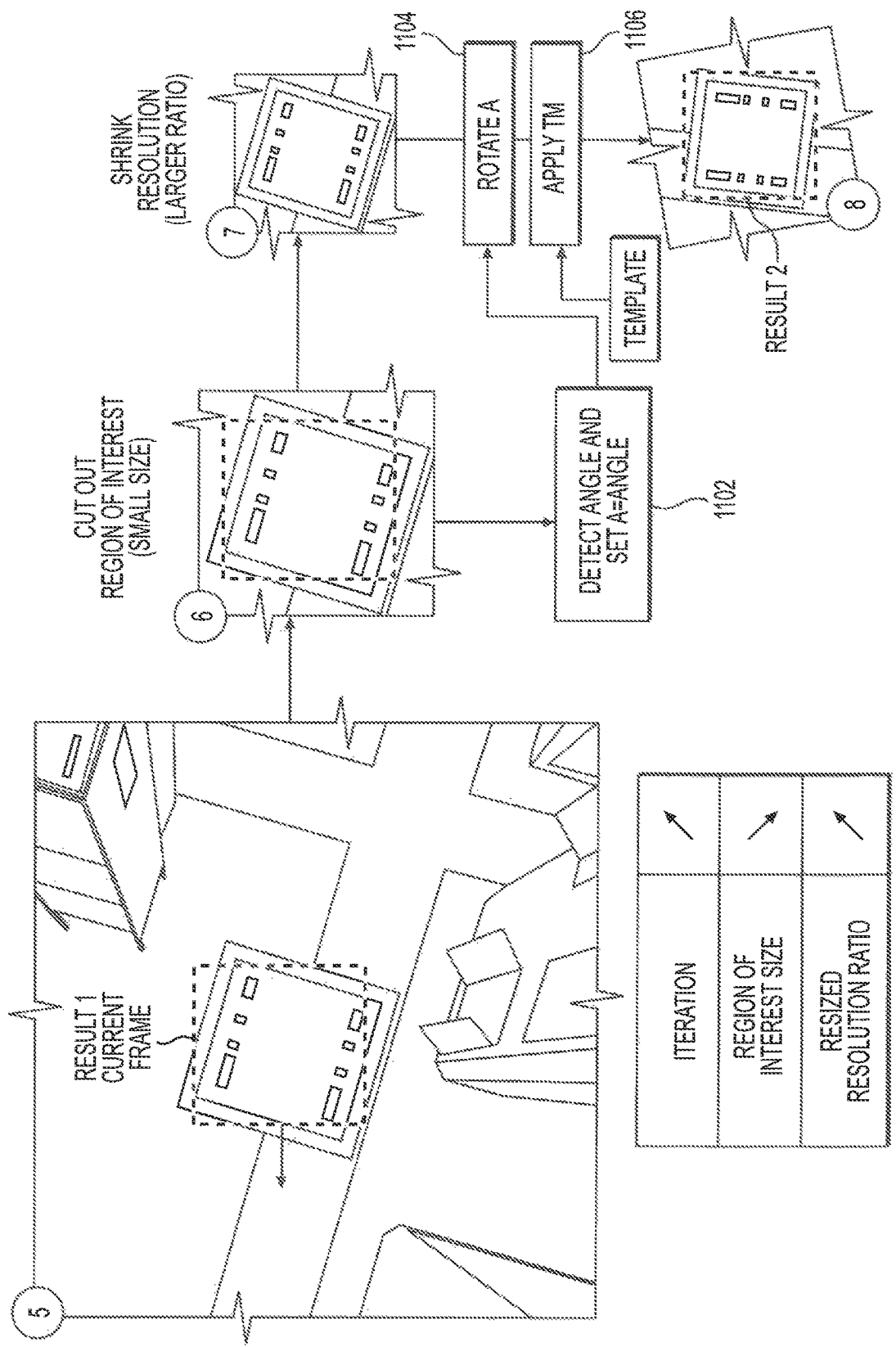
FIG. 11 shows a process flow of a second iteration of the method shown in FIG. 9.

FIG. 11 shows a second iteration. In image 5, the method goes back to the input video frame. This time, the result is drawn from the first iteration instead of the previous location and heading angle. This is the concept of refinement. In image 6, the region of interest is again cropped. But this time, a smaller region is cropped. The confidence score from the first iteration is used, such that the higher the confidence score, the smaller the cropping region. In image 7, the video frame is shrunk. Compared to image 3, the resulting image is at a higher resolution.

The angle A is to be that of the previous frame angle (step 1012), and rotation of the video frame by angle A is detected and set (step 1102). Then, the shrunk video frame is rotated by angle A in step 1104, and the rotated video frame is template matched with the current template, in step 1106.

Afterwards, since the method is more confident that the region of interest contains mostly the target object 104, the angle can be detected. Then, template matching with similar steps as before is performed.

Figure 12:
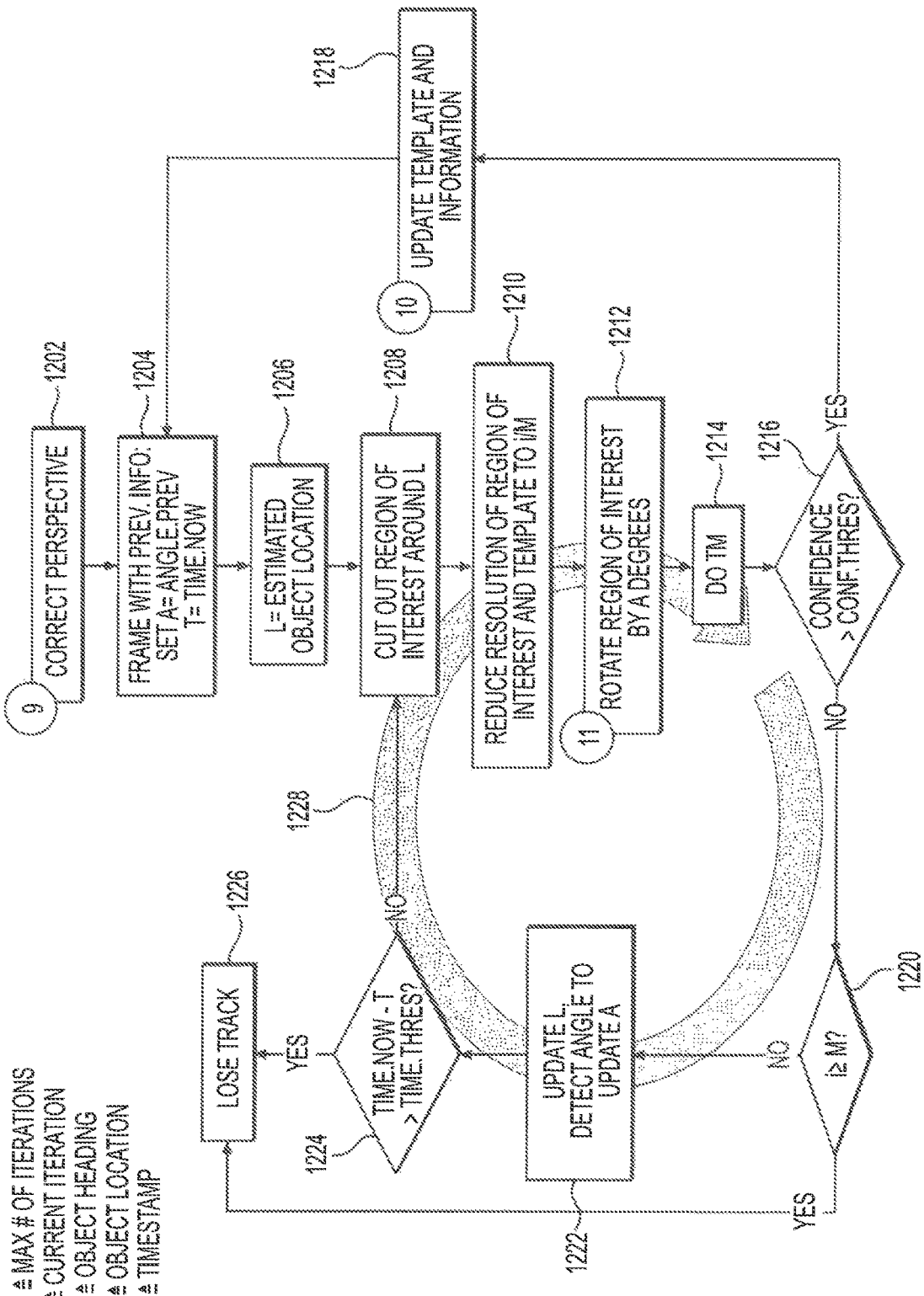
FIG. 12 illustrates a flow diagram corresponding to scale, appearance, variations and rotate steps of a tracking method according to an embodiment.

FIG. 12 shows functional blocks 9, 10 and 11 corresponding to the scale, appearance variations and rotate steps as previously discussed. The loop 1228 corresponds to the Speed section.

In step 1202, perspective scaling is performed to correct the scaling. In step 1204, a video frame with previous information is used, meaning the inputs of the present method: a frame and a target's previous information: angle, location, appearance. The angle A of the previous frame is set, and a time Tis set to the present. In step 1206, an estimated object current location L is determined. In step 1208, a region of interest is cut out around the estimated object current location L. Then, a reduction in the resolution of the region of interest and the template to i/M is done in step 1210, wherein i is the current iteration and M is the maximum number of iterations permitted. In step 1212, the region of interest is rotated by A degrees, and template matching is performed and a confidence score is determined in step 1214. If the confidence score is greater than a confidence threshold in step 1216, the template and angle, location, and appearance information are updated in Step 1218, and the process returns to step 1204. If the confidence score is not greater than the confidence threshold value, then it is checked whether i>=M.

If i not>=M, then the estimated object current location L is updated, and the new angle A is detected and updated in step 1222. In step 1224, it is determined if the (time now-T) is greater than a time threshold. If the time now-L is greater than the time threshold, the process stops at step 1226.

If i>=M in step 1220, the process goes directly to stopping the iterative template matching process in step 1226.

Figure 13:
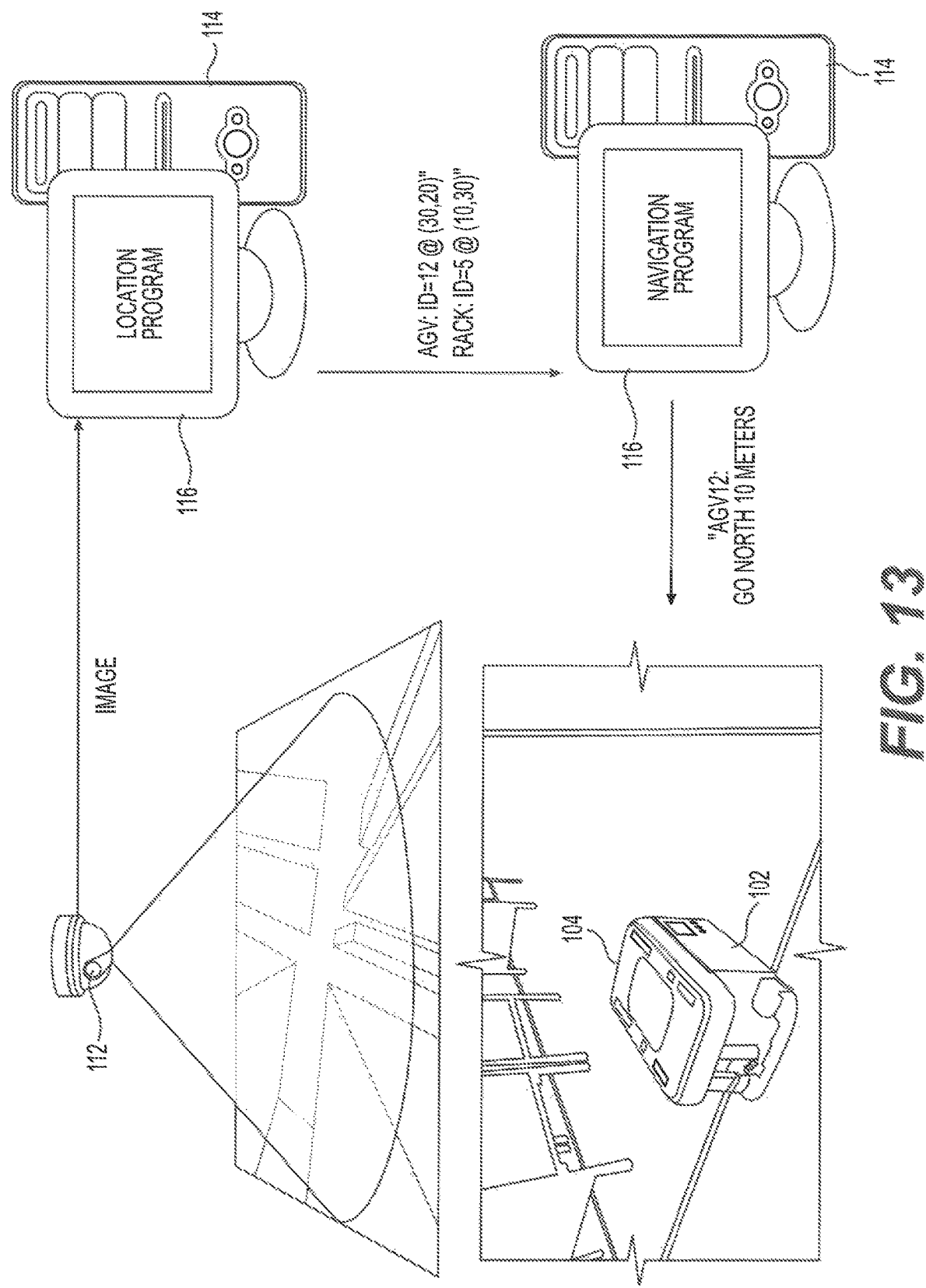
FIG. 13 illustrates the tracking system for tracking a tracking a target object and for controlling the target object.

Another way to estimate the current location is using a motion model. For example, it can be assumed that the target is always moving at a constant speed in the heading direction, then the estimated current location will be a constant shift of pixels away from the previous location. More complex motion models can be used depending on the object type (for example, wheeled and legged vehicle would have different models FIG. 13 illustrates the tracking system 100 for tracking the target object 104 affixed to the AGV 102 as the target object 104 moves around the factory floor 106, and for controlling the target object 104 to move in a desired path set controlled by a user. The camera 112 takes the video frames of the factory floor 106 including the target object 104, and forwards the video frames to the server 114 where a user can view and control the entire system 100 by seeing what is presented on a display 116. The processor 204 of the server 114 performs the iterative template matching according to embodiments of the present invention so that the user can accurately track the target object 104 (and the AGV 102 of course to which the tracking object 104 is affixed) in real-time. Once the user has accurate position and orientation data of the target object 104, the user can control the heading and speed of the AGV 102 via the display 116 and the computer server 114 by sending control signals from the receiver/transmitter 208 via the communication link 202 to the AGV 102.

As described above, aspects of the present invention include a tracking method and system using an iterative template matching approach to locate target objects efficiently through the use of a camera without the need of any extra sensors or cameras.

According to a method, iterative template matching reduces computation time of a server for real-time application purposes. Within a target time, the method goes through a refinement process to improve accuracy.

The method is able to adjust to target object appearance variations, using a calibration procedure, a template update procedure, and an angle detection procedure.

The method estimates an object's new location by narrowing down a search region within a neighborhood of a target object. An assumption is made that location and orientation of the target object will not change much between video frames of a camera, which is generally true when the target object is distant from the camera.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An iterative method of tracking a position and orientation of a target object that moves along a two-dimensional plane, comprising:
   generating video frames of the target object using a camera;
   correcting perspective scaling of a current one of the video frames;
   estimating a current location and angle of the target object using a motion model or its previous location/angle;
   cutting out a region of interest from the current video frame around the estimated current location;
   resizing the region of interest to shrink its size by a predetermined ratio M (width=width/M, height=height/M) or equivalently reducing the image resolution of the region of interest by the ratio M (resolution=resolution/M);
   tracking a new location of the target object by template matching the current region of interest with a previously stored template; and
   either
      concluding the tracked target object location and angle are accurate and updating the template if a stopping criterion is reached with indication of successful tracking, or
      proceeding with a refinement method to refine the tracked location and angle until the stopping criterion is eventually reached.

2. The iterative method according to claim 1, wherein the refinement method comprises:
   further refining current location and angle of the target object by iteratively:
   cutting out a new and smaller region of interest from the current video frame around the current location;
   rotating the new region of interest using a new angle of the target object;
   shrinking size of the new region of interest by a ratio R that is larger than 1 but smaller than M or equivalently shrinking the image resolution of the region of interest by a ratio smaller than M; and tracking a new location of the target object by template matching the new region of interest with a previously stored template until a stopping criterion is reached.

3. The iterative method according to claim 2, wherein the ratio R is determined:
   depending on number of iterations executed;
   wherein R is closer to 1 if more iterations are executed, and R is closer to the predetermined ratio M if less iterations are executed.

4. The iterative method according to claim 2, wherein the new angle is estimated by:
   estimating a plurality of angle candidates by an edge-based algorithm; clustering the plurality of angle candidates; and
   calculating an absolute numerical difference between an original angle with the plurality of angle clusters and finding the lowest difference.

5. The iterative method according to claim 2, wherein the new angle is estimated by:
   reducing the image processing resolution;
   cutting out the region of interest from current frame around a previous position of the target object; rotating the current region of interest with a plurality of neighboring angles;
   conducting template matching between the stored template and the plurality of rotated regions of interest respectively and finding out the plurality of highest confidence scores; and
   finding the angle with the greatest highest confidence score.

6. The iterative method according to claim 1, wherein the correcting of the perspective scaling comprises:
   estimating camera optical properties including camera intrinsic matrix and distortion coefficients; and
   establishing a coordinate system into the camera by marking multiple real-world coordinates onto video frames generated by the camera.

7. The iterative method according to claim 1, wherein the template matching directly uses the previously stored template to calculate a normalized cross correlation to get a confidence score.

8. The iterative method of claim 1, wherein the template matching comprises:
   separating foreground and background pixels on the previously stored template;
   marking the background pixels in the previously stored template to be don't-cares; and
   calculating a normalized cross correlation using the marked template, while ignoring all of the don't-care pixels.

9. The iterative method according to claim 1, wherein the stopping criterion is reached if one of the following is satisfied:
   a template matching confidence score is above a predetermined threshold score, indicative of successful tracking;
   a running time of the iteratively reducing the image processing resolution is higher than a predetermined time threshold, indicative of unsuccessful tracking, or
   a number of the iterations is greater than a predetermined maximum number of iterations, indicative of unsuccessful tracking.

10. The iterative method according to claim 1, wherein the updating of the template image comprises:
    performing template matching with the confidence score normalized to a range between 0 and 1 according to:

$$R(x, y) = \frac{\sum_{x',y'} (T(x', y') \cdot I(x+x', y+y'))}{\sqrt{\sum_{x',y'} T(x', y')^2 \cdot \sum_{x',y'} I(x+x', y+y')^2}}$$

cropping out an image patch with a highest template matching confidence score from the rotated region of interest; denoting the image patch by $T_{out}$ and the corresponding confidence score by $R_{out}$
updating the template image is performed according to:

$$T_{new} = T_{current} - R_{out} \times (E * (T_{current} - T_{out}));$$

where $T_{new}$, $T_{current}$ and $T_{out}$ are all a template matrix of the same dimension, and $T_{new}$ is the template made for the next video frame, $T_{current}$ is the template that was used in the current video frame to do template matching, E is a matrix for erosion, and * is a convolution operator.

11. A system for tracking a position and orientation of a target object that moves along a two-dimensional plane, comprising:
a camera to generate video frames of the target object; and
a processor configured to:
correct perspective scaling of a current one of the video frames;
estimate a current location and angle of the target object using a motion model or its previous location/angle;
cut out a region of interest from the current video frame around the estimated current location;
resize the region of interest to shrink its size by a predetermined ratio M (width=width/M, height=height/M) or equivalently reducing the image resolution of the region of interest by the ratio M (resolution=resolution/M);
track a new location of the target object by template matching the current region of interest with a previously stored template; and
either
conclude the tracked target object location and angle are accurate and updating the template if a stopping criterion is reached with indication of successful tracking, or
proceed with a refinement method to refine the tracked location and angle until the stopping criterion is eventually reached.

12. The system according to claim 11, wherein the processor further refines current location and angle of the target object by iteratively:
cutting out a new and smaller region of interest from the current video frame around the current location;
rotating the new region of interest using a new angle of the target object;
shrinking size of the new region of interest by a ratio R that is larger than 1 but smaller than M or equivalently shrinking the image resolution of the region of interest by a ratio smaller than M; and
tracking a new location of the target object by template matching the new region of interest with a previously stored template until a stopping criterion is reached.

13. The system according to claim 12, wherein the ratio R is determined:
depending on number of iterations executed;
wherein R is closer to 1 if more iterations are executed, and R is closer to the predetermined ratio M if less iterations are executed.

14. The system according to according to claim 13, wherein the stopping criterion is fulfilled if one of the following is satisfied if:
a template matching confidence score is above a predetermined threshold score, indicative of successful tracking;
a running time of the iteratively reducing the image processing resolution is higher than a predetermined time threshold, indicative of unsuccessful tracking, or
a number of the iterations is greater than a predetermined maximum number of iterations, indicative of unsuccessful tracking.

15. The system according to claim 11, wherein the processor corrects the perspective scaling by:
estimating camera optical properties including camera intrinsic matrix and distortion coefficients; and
establishing a coordinate system into the camera by marking multiple real-world coordinates onto video frames generated by the camera.

16. The system according to claim 11, wherein the template matching directly uses the previously stored template to calculate a normalized cross correlation to get a confidence score.

17. The system according to claim 11, wherein the template matching comprises:
separating foreground and background pixels on the previously stored template;
marking the background pixels in the previously stored template to be don't-cares; and
calculating a normalized cross correlation using the marked template, while ignoring all of the don't-care pixels.

18. The system according to claim 11, wherein the updating of the template image comprises:
performing template matching with the confidence score normalized to a range between 0 and 1 according to:

$$R(x, y) = \frac{\sum_{x',y'} (T(x', y') \cdot I(x+x', y+y'))}{\sqrt{\sum_{x',y'} T(x', y')^2 \cdot \sum_{x',y'} I(x+x', y+y')^2}}$$

cropping out an image patch with a highest template matching confidence score from the rotated region of interest; denoting the image patch by $T_{out}$ and the corresponding confidence score by $R_{out}$
updating the template image is performed according to:

$$T_{new} = T_{current} - R_{out} \times (E * (T_{current} - T_{out}));$$

where $T_{new}$, $T_{current}$ and $T_{out}$ are all a template matrix of the same dimension, and $T_{new}$ is the template made for the next video frame, $T_{current}$ is the template that was used in the current video frame to do template matching, E is a matrix for erosion, and * is a convolution operator.

19. A non-transitory computer readable medium to control a method of iteratively tracking a position and orientation of a target object that moves along a two-dimensional plane by operating a program on a processor, the method comprising:
generating video frames of the target object using a camera;
correcting perspective scaling of a current one of the video frames;
estimating a current location and angle of the target object using a motion model or its previous location/angle;
cutting out a region of interest from the current video frame around the estimated current location;
resizing the region of interest to shrink its size by a predetermined ratio M (width=width/M, height=height/M) or equivalently reducing the image resolution of the region of interest by the ratio M (resolution=resolution/M);
tracking a new location of the target object by template matching the current region of interest with a previously stored template; and
either
concluding the tracked target object location and angle are accurate and updating the template if a stopping criterion is reached with indication of successful tracking; or
proceeding with a refinement method to refine the tracked location and angle until the stopping criterion is eventually reached.

* * * * *